US007717712B2

(12) United States Patent
Brun et al.

(10) Patent No.: US 7,717,712 B2
(45) Date of Patent: May 18, 2010

(54) METHOD AND APPARATUS FOR LANGUAGE LEARNING VIA CONTROLLED TEXT AUTHORING

(75) Inventors: Caroline Brun, Grenoble (FR); Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 257 days.

(21) Appl. No.: 10/739,178

(22) Filed: Dec. 19, 2003

(65) Prior Publication Data

US 2005/0137847 A1    Jun. 23, 2005

(51) Int. Cl.
G09B 19/00 (2006.01)
G09B 5/00 (2006.01)
G09B 7/00 (2006.01)
G06F 17/28 (2006.01)

(52) U.S. Cl. .................. 434/156; 434/169; 434/362; 701/1; 701/4

(58) Field of Classification Search .......... 434/156, 434/157, 167, 169, 353, 350, 322, 176, 177, 434/323, 324, 325, 332; 704/1, 4
See application file for complete search history.

(56) References Cited

U.S. PATENT DOCUMENTS

| 4,041,467 A | 8/1977 | Cota et al. |
| 4,566,065 A | 1/1986 | Toth |
| 4,632,578 A | 12/1986 | Cuff et al. |
| 4,858,170 A | 8/1989 | DeWick, Sr. et al. |
| 4,893,238 A | 1/1990 | Venema |
| RE33,337 E | 9/1990 | Lefler et al. |
| 5,141,439 A * | 8/1992 | Cousins ...................... 434/178 |
| 5,426,583 A | 6/1995 | Uribe-Echebarria Diaz De Mendibil |
| 5,466,072 A | 11/1995 | McCready |
| 5,477,451 A | 12/1995 | Brown et al. |
| 5,565,316 A * | 10/1996 | Kershaw et al. ............. 434/322 |
| 5,606,498 A | 2/1997 | Maruta et al. |
| 5,678,053 A * | 10/1997 | Anderson ...................... 704/1 |

(Continued)

FOREIGN PATENT DOCUMENTS

EP        0610151 A1    8/1994

(Continued)

OTHER PUBLICATIONS

Gordon A. Hale et al. TOEFL Research Reports, report 26, Multiple-choice cloze items and the test of english as a foreign language, Mar. 1988, entire document.*

(Continued)

Primary Examiner—Kathleen Mosser
Assistant Examiner—Kang Hu
(74) Attorney, Agent, or Firm—Oliff & Berridge, PLC

(57) ABSTRACT

A method for testing a language learner's ability to create semantically coherent grammatical text in a language, comprising generating text having at least one active region and inactive regions; displaying the text in a graphical user interface on a display unit, wherein at least one active region comprises a key word or phrase; identifying at least one active region in the graphical user interface; selecting at least one active region to display a menu of linguistic choices comprised of at least one grammatically correct linguistic choice and at least one grammatically incorrect linguistic choice; selecting one of the linguistic choices; and displaying an error message when at least one grammatically incorrect linguistic choice is selected.

13 Claims, 9 Drawing Sheets

U.S. PATENT DOCUMENTS

| | | | | | |
|---|---|---|---|---|---|
| 5,711,673 | A | * | 1/1998 | Grundy, Jr. | 434/353 |
| 5,810,599 | A | * | 9/1998 | Bishop | 434/157 |
| 5,827,070 | A | * | 10/1998 | Kershaw et al. | 434/322 |
| 5,915,971 | A | * | 6/1999 | Ramsay et al. | 434/276 |
| 5,991,711 | A | | 11/1999 | Seno et al. | |
| 6,012,075 | A | * | 1/2000 | Fein et al. | 715/540 |
| 6,041,292 | A | | 3/2000 | Jochim | |
| 6,091,956 | A | | 7/2000 | Hollenberg | |
| 6,120,297 | A | * | 9/2000 | Morse et al. | 434/169 |
| 6,175,841 | B1 | * | 1/2001 | Loiacono | 715/205 |
| 6,345,243 | B1 | | 2/2002 | Clark | |
| 6,349,203 | B1 | | 2/2002 | Asaoka et al. | |
| 6,405,167 | B1 | * | 6/2002 | Cogliano | 704/251 |
| 6,424,829 | B1 | | 7/2002 | Kraft | |
| 6,424,983 | B1 | * | 7/2002 | Schabes et al. | 715/533 |
| 6,470,170 | B1 | * | 10/2002 | Chen et al. | 434/350 |
| 6,632,096 | B1 | * | 10/2003 | Sumimoto | 434/322 |
| 6,652,283 | B1 | * | 11/2003 | Van Schaack et al. | 434/236 |
| 7,042,443 | B2 | * | 5/2006 | Woodard et al. | 345/173 |
| 2002/0086268 | A1 | * | 7/2002 | Shpiro | 434/156 |
| 2002/0089470 | A1 | | 7/2002 | Raman et al. | |
| 2002/0119433 | A1 | * | 8/2002 | Callender | 434/322 |
| 2002/0182578 | A1 | * | 12/2002 | Rachman et al. | 434/350 |
| 2004/0219502 | A1 | * | 11/2004 | Bechard et al. | 434/322 |
| 2004/0224292 | A1 | * | 11/2004 | Fazio | 434/156 |
| 2005/0037324 | A1 | * | 2/2005 | Sumimoto | 434/322 |
| 2006/0256088 | A1 | * | 11/2006 | Kong | 345/168 |

FOREIGN PATENT DOCUMENTS

| | | |
|---|---|---|
| JP | A-1-222367 | 9/1989 |
| WO | WO 93/22733 | 11/1993 |
| WO | WO 95/17729 | 6/1995 |

OTHER PUBLICATIONS

M. Dalrymple et al., "Tools for Morphological Analysis", *Center for the Study of Languages and Information*, Report No. CSLI-87-108, Sep. 1987.

I. Melcuk et al., "A Formal Lexicon in the Meaning-Text Theory (or How to Do Lexica with Words)," *Computational Linguistics*, vol. 13, Nos. 3-4, Jul.-Dec. 1987, pp. 261-275.

G. Miller, "WordNet: A Lexical Database for English," *Communications of the ACM*, vol. 38, No. 11, Nov. 1995, pp. 39-41.

J. Coch, "Evaluating and Comparing Three-Text Production Techniques", Proceedings COLING, pp. 249-254 (1996).

A. Ranta, "A Functional Framework for Grammars," 1998.

A. Ranta, "Grammatical Framework Implementation and Interfaces," 1999.

A. Ranta, "Grammatical Framework Syntax and Semantics," 1999.

A. Ranta, "Grammatical Framework Tutorial," 1999.

B. Baker, "Semantic Compaction for Sub-Sentence Vocabulary Units Compared to Other Encoding and Prediction Systems", *Minspeak Corporation*., In Proceedings of the $10^{th}$ Conference on Rehabilitation Technology, pp. 118-120, RESNA, San Jose, CA (1984).

A. Carlberger et al., "Profet, A New Generation of Word Prediction: An Evaluation Study", pp. 23-28, 1997.

R. Power et al. , "Multilingual Authoring Using Feedback Texts", *Computational Linguistics*, pp. 1053-1059, 1998.

R. Power et al., "Multilingual Authoring Using Feedback Texts", *Information Technology Research Institute Technical Report Series*, pp. 1053-1059, Aug. 1998.

A. Max, "Reversing Controlled Document Authoring to Normalize Documents", in the Proceedings of the EACL'03 Student Research Workshop, Budapest, Hungary, 2003, pp. 33-40.

A. Max et al., "Document Content Analysis Through Inverted Generation", in AAAI 2002 Spring Symposium on Using (and Aquiring) Linguistic (and World) Knowledge for Information Access, Stanford University, US, pp. 33-40, 2002.

M. Dymetman et al. , "XML and Multilingual Document Authoring: Convergent Trends"., in Proceedings COLING 2000, pp. 243-249, Saarbrücken, Aug. 2000.

C. Brun et al., "Document Structure and Multilingual Authoring", Proceedings of First International Conference on Language Generation, (INGL'2000), Mitzpe Ramon Israël, 2000.

Game Commander, Product Q&A, http://www.gamecommander.com/products/pfaq.html, Jun. 2003, p. 1-4.

D. Rosenthal et al., Voice-Enabled, Structured Medical Reporting, Jan./Feb. 1998 (vol. 13, No. 1) web page summary (one page).

D. Rosenthal et al., Voice-Enabled, Structured Medical Reporting, Jan./Feb. 1998 (vol. 13, No. 1) p. 70-73.

A. Ranta, "Grammatical Framework: A Type-Theoretical Grammar Formalism", *Department of Computing Science*, pp. 1-41, 2003.

Foster et al., TransType: Text Prediction for Translators, RALI, Université de Montréal, (2002).

U.S. Appl. No. 10/727,614, filed Dec. 5, 2003.

Christopher D. Manning and Hinrich Schütze, Foundations of Statistical Natural Language Processing, Chapter 15, MIT Press 1999.

Matt Ginnsberg, Essentials of Artificial Intelligence, Chapter 4, Morgan Kaufmann, 1993.

U.S. Appl. No. 10/065,443 "System for Learning a Language" filed Oct. 18, 2002.

* cited by examiner

METHOD AND APPARATUS FOR LANGUAGE LEARNING VIA CONTROLLED TEXT AUTHORING

BACKGROUND OF THE INVENTION

1. Field of Invention

The present invention relates to controlled text authoring systems and methods for language learning.

2. Description of Related Art

The composition of short essays by students is a classical tool of language learning courses such as second-language learning courses. However, these activities presuppose the availability of a teacher who is completely fluent in the second language being learned. Current automated tools for interactive language learning can not compete with a human teacher in the tasks of grading and correcting free-text compositions. While spell checkers can provide some help to the student, grammar checkers are at best good enough only to provide warnings of possible misuse. However, even when the warnings are limited to a sentence and to syntactic, as opposed to semantic, aspects, grammar checkers do not provide reliable automatic corrections.

SUMMARY OF THE INVENTION

One potential solution is in the field of controlled document authoring, which is a field concerned with the interactive production of documents. Typically, the user of these systems may select possible semantic choices in active fields present in the evolving text of the document in the user's language. These selections iteratively refine the document content until it is complete. The authored document may then be translated into multiple languages. One such type of controlled document authoring system is the multilingual document authoring system (MDA) described in "Document Structure and Multilingual Text Authoring" by Caroline Brun, Marc Dymetman and Veronika Lux; in the Proceedings of First International Conference on Natural Language Generation (INLG'2000), Mitzpe Ramon, Israël, 2000, which is incorporated herein by reference in its entirety.

The MDA system relies on a formal mechanism (a kind of unification grammar) for describing well-formed semantic representations and their textual realizations in several languages or writing styles. These specifications are restricted to specific domains of discourse for which a relatively complete modeling of document content is possible, such as pharmaceutical leaflets, experimental reports, classified adds, etc. Such specifications can also be used as enumeration mechanisms, which deterministically generate well-formed semantic representations along with their global textual realizations. However, the MDA global text realizations are generated by asking a user to respond to questions in the user's own language through menu selections associated with different possible paths in an enumeration process as described in "Document Structure and Multilingual Text Authoring" by Caroline Brun, Marc Dymetman and Veronika Lux; in the Proceedings of First International Conference on Natural Language Generation (INLG'2000), Mitzpe Ramon, Israël, 2000.

Although the author of the text is working in the language he or she knows, the MDA system is building a language independent representation of the document content. From this representation, the MDA system constructs multilingual texts in any of several languages simultaneously. However, the MDA system does not provide a system enabling the user who is responding to questions in the user's own language to learn another language, such as one of the languages automatically generated by the MDA system based upon the language independent representations. The MDA system does not provide a language learning system. Therefore, there is a need for a document authoring system for language learning via controlled text authoring.

This invention provides systems and methods for enabling language learners to exercise lexical, grammatical and/or stylistic skills of a second language by monitoring a student's input text and providing the student with reliable feedback. The text can include one or more of a phrase, a sentence, a paragraph, a poem, a sonnet, a song, a story, a lyric, a novel, a composition or any textual expression.

This invention separately provides systems and methods for selecting at least one active region to display a menu of linguistic choices comprising at least one linguistically correct choice and at least one linguistically incorrect choice, selecting one of the linguistic choices, and displaying an error message when at least one linguistically incorrect choice is selected.

This invention separately provides systems and methods for selecting at least one active region to display a menu of linguistic choices comprising at least one grammatically correct linguistic choice and at least one grammatically incorrect linguistic choice, selecting one of the linguistic choices, and displaying an error message when at least one grammatically incorrect linguistic choice is selected.

This invention separately provides systems and methods for selecting a correct linguistic choice to cause the linguistic choices in other active regions to change.

In various exemplary embodiments of the systems and methods according to this invention, text having at least one active region is generated.

In various exemplary embodiments, text including at least one active region is displayed in a graphical user interface.

In various exemplary embodiments, at least one active region is selected to display a menu of linguistic choices including at least one linguistically correct choice and one linguistically incorrect choice.

In various exemplary embodiments, one linguistic choice is selected and an error message is provided when at least one incorrect linguistic choice is selected.

In various exemplary embodiments, at least one active region is selected to display a menu of linguistic choices including at least one linguistically correct choice and a plurality of linguistically incorrect choices.

In various exemplary embodiments, at least one active region is selected to display a menu of linguistic choices including linguistically correct choices and linguistically incorrect choices.

In various exemplary embodiments, the text has one active region comprising one of a phrase, a sentence, a paragraph, a poem, a sonnet, a song, a story, a lyric, a novel, a composition and a textual expression having at least one active region.

In various exemplary embodiments, at least one active region is one of a plurality of semantic representations generated from a semantic grammar.

In various exemplary embodiments, one of the correct linguistic choices is selected, which causes the linguistic choices in other active regions to change.

In various exemplary embodiments of the systems and methods according to this invention, a text generator generates text having at least one active region.

In various exemplary embodiments, a display device displays the text containing at least one active region in a graphical user interface, wherein the active region comprises a keyword or phrase.

In various exemplary embodiments, an input device enables a language learner to select at least one active region to display a menu of linguistic choices including at least one correct linguistic choice and one incorrect linguistic choice.

In various exemplary embodiments, an output device provides an error message when at least one linguistically incorrect choice is selected.

In various exemplary embodiments, the text has a plurality of active regions.

In various exemplary embodiments, a computer usable medium has a computer readable program code embodied therein for causing a computer to provide language learning for a learner, wherein the computer readable program code causes a computer to generate a text comprising an active region, enable a language learner to select an active region, and display a menu of at least one correct linguistic choice and at least one incorrect linguistic choice.

In various exemplary embodiments, a computer usable medium has a computer readable program code embodied therein for causing a computer to provide an error message when a language learner selects an incorrect linguistic choice.

In various exemplary embodiments, a computer usable medium has a computer readable program code embodied therein for causing a computer to receive a selection of a correct linguistic choice from a menu of an active region by a language learner and change the linguistic choices of other active regions based on the selected linguistic choice.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following Figures, wherein.

DETAILED DESCRIPTION OF EXEMPLARY EMBODIMENTS

In accordance with various exemplary embodiments of the systems and methods according to this invention, a language learner is provided with a virtual space of controlled texts. These texts may be grammatically, syntactically, semantically, and/or contextually controlled. The language learner may navigate this virtual space by making choices that may be contextually dependent on previous choices and may lead to different textual developments. The types of text may include a phrase, a sentence, a paragraph, a poem, a sonnet, a song, a story, a lyric, a novel, a composition and an expression.

In accordance with various exemplary embodiments of the systems and methods according to this invention, active regions are provided in the text. The language learner can select an active region, which provides a menu of possible correct and incorrect linguistic choices. A correct linguistic choice may be a choice which is semantically, grammatically, syntactically, and/or contextually correct. An incorrect linguistic choice may be a choice which is not semantically, grammatically, syntactically, and/or contextually correct. The language learner can select an active region and make choices by using an input device such as a keyboard, a key, a button, a touch pad, a mouse, a microphone, and the like. Any device capable of converting or sending an electrical signal to the system can be used as an input device. In the embodiments, feedback is provided to the language learner using an output device, such as a display device, printing device, sound device, and the like.

In accordance with various exemplary embodiments of the systems and methods according to this invention, an error message is provided to the language learner if a linguistically incorrect choice is selected. The error message may include an explanation as to why the selection was incorrect. The error message may also provide one or more correct linguistic choices with an explanation as to why the correct linguistic choices are correct. In addition, if the language learner inputs a correct linguistic choice, the menu selections of the other active regions may change based on the selected linguistic choice. The menu of linguistic choices may include one or more correct linguistic choices and one or more incorrect linguistic choices.

Figure 1:
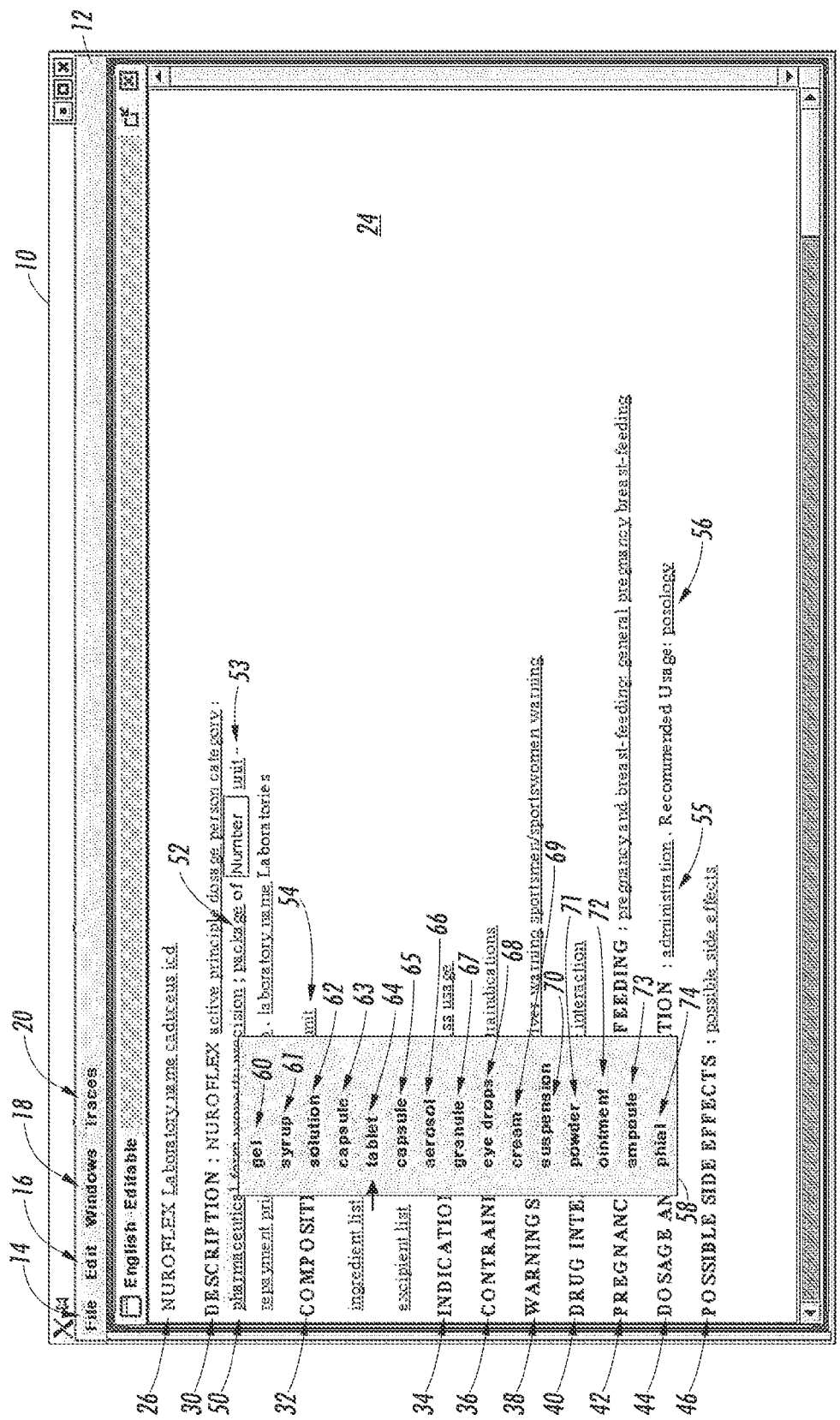
FIGS. 1-3 show an exemplary graphical user interface in the related art multilingual document authoring system.
Figure 2:
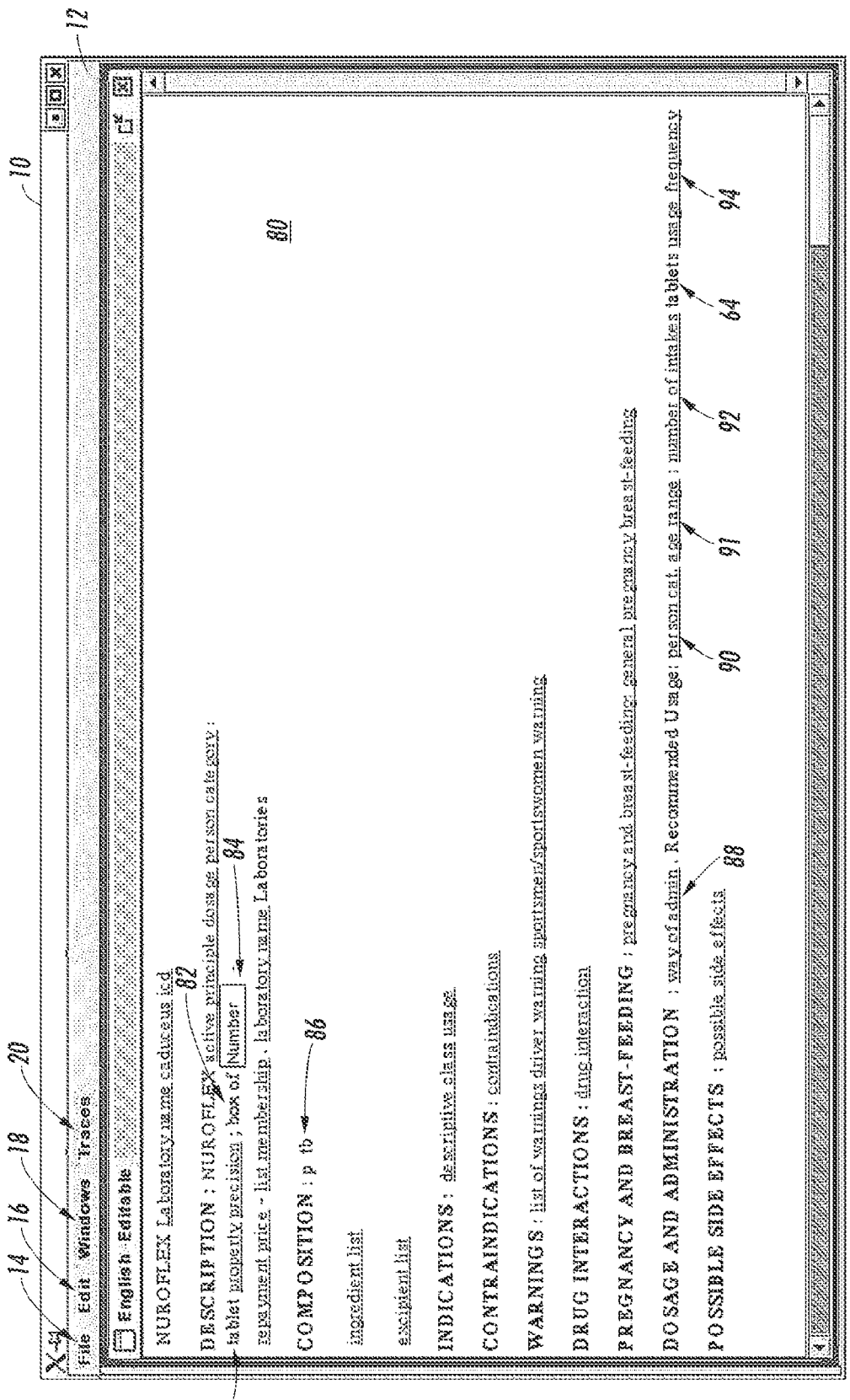
Figure 3:
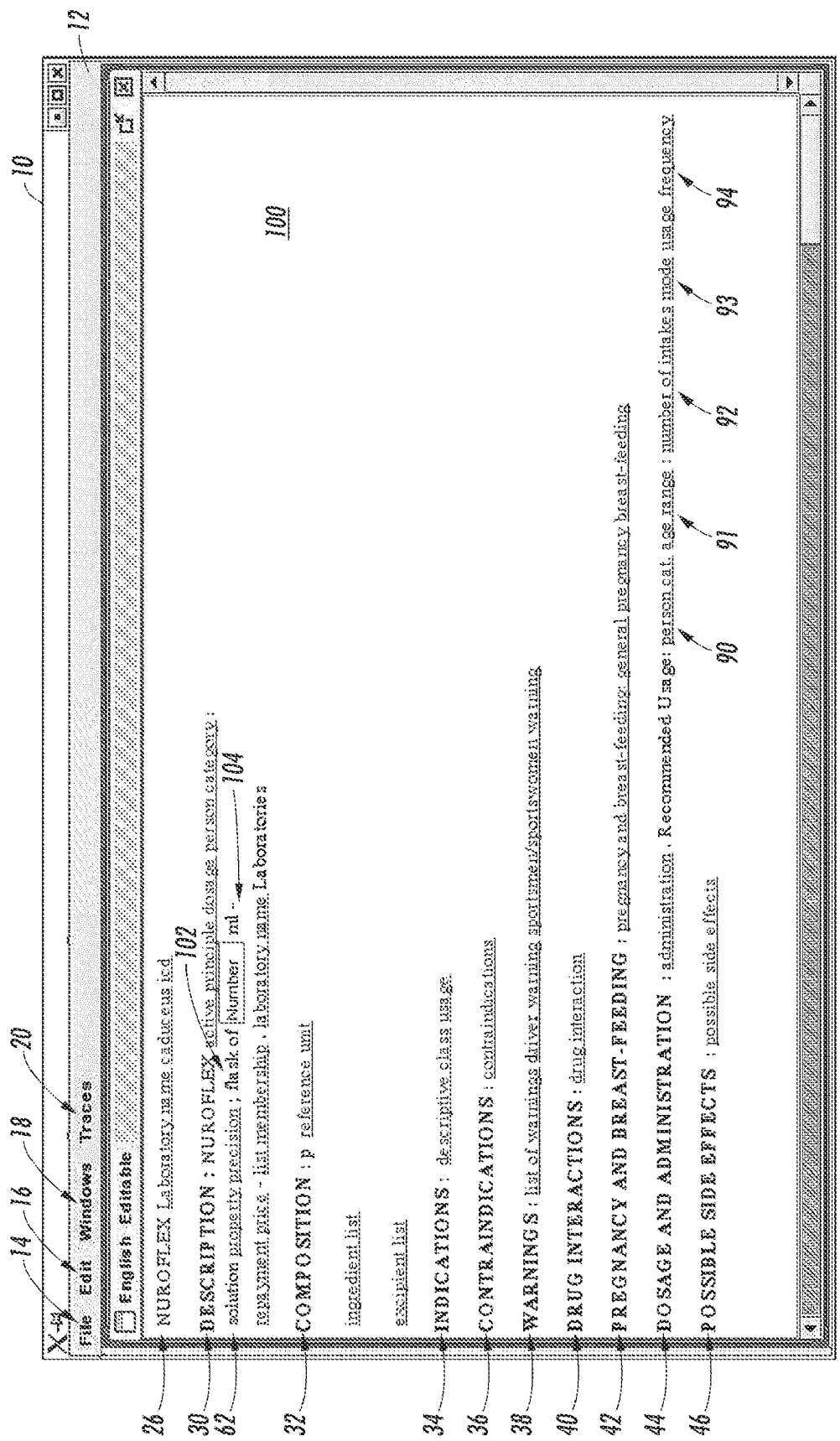

FIGS. 1-3 show an exemplary embodiment of a graphical user interface of the MDA system, discussed above, applied to the authoring of drug package leaflets. The MDA system controls the production of documents, so that only semantically and syntactically coherent grammatical text is produced. FIG. 1 illustrates a first step in the authoring process. Some parts of the document text have been created but other parts still need to be described. The parts shown as underlined keywords are called active regions or slots, and correspond to choices of content that still need to be made by the author. These choices are selected through menus, and serve to augment an underlying (not shown) semantic representation for the document from which the displayed text is automatically generated in multiple languages (only English is shown here).

For example, as shown in FIG. 1, a graphical user interface provides a window 10 having a toolbar 12 including menu items file 14, edit 16, windows 18 and traces 20. These menu items have dropdown menus that allow a user to select a file, edit a file, view different windows and trace communication between different underlying MDA processes (for debugging purposes).

In FIG. 1, the window 24 shows the first step in providing semantically coherent grammatical text for a desired subject matter, a drug "NUROFLEX" 26. As discussed above, some parts of the document, for example, a drug package leaflet, have already been created and other parts still need to be completed. For example, "description" 30, "composition" 32, "indications" 34, "contraindications" 36, "warnings" 38, "drug interactions" 40, "pregnancy and breast-feeding" 42, "dosage and administration" 44, and "possible side effects" 46 have already been created because these are standard texts in all drug package leaflets. The parts shown as underlined keywords are active regions and correspond to choices of content that still need to be made by the author, user or operator. Examples of active regions includes "pharmaceutical form" 50, "package" 52, "unit" 53, "reference unit" 54, "administration" 55, and "posology" 56. Each active region corresponds to a semantic representation. The semantic representations are under the control of a "content grammar," which defines a potentially infinite set of structures built from a limited repertoire of semantic constructors, e.g., constants or functions, and enforces certain long-distance semantic coherence conditions.

For example, as discussed above, "pharmaceutical form" 50 is an active region. When a user highlights or otherwise selects an active region such as "pharmaceutical form" 50, the graphical user interface provides a dropdown menu associated with the active region. As shown in FIG. 1, the dropdown menu 58 is associated with the active region, "pharmaceutical form" 50. The dropdown menu 58 includes "gel" 60, "syrup" 61, "solution" 62, "capsule" 63, "tablet" 64, "capsule" 65, "aerosol" 66, "granule" 67, "eye drops" 68, "cream" 69, "suspension" 70, "powder" 71, "ointment" 72, "ampoule" 73 and "phial" 74. If a user selects one of these items from the dropdown menu 58, this item will be substituted for "pharmaceutical form" 50 by the graphical user interface 10.

As shown in FIG. 2, if the user selects tablet 64 from menu 58, the graphical user interface displays window 80 showing the substitution of "tablet" 64 for the term "pharmaceutical form" 50. The choice of the semantic constant "tablet" 64 creates a new piece of text "box" 82, which is substituted for the active region "package" 52. In addition, a blank space 84 is substituted for "unit" 53, "tb" 86 is substituted for "reference unit" 54; "way of administration" 88 is substituted for "administration" 55; and "person category" 90, "age range" 91, "number of intakes" 92, "tablets" 64, and "usage frequency" 94 are substituted for "posology" 56 in window 80.

Alternatively, in another example, if the user had selected "solution" 62 instead of "tablet" 64, the graphical user interface would have displayed window 100 as shown in FIG. 3. By selecting "solution" 62, "flask" 102 is substituted for "package" 52 and "ml" 104 is substituted for "unit" 53. In addition, "person category" 90, "age range" 91, "number of intakes" 92, "mode" 93, and "usage frequency" 94 are substituted for "posology" 56 as shown in FIG. 3. As shown from the above examples, the user continues to select each active region until no active regions remain and the drug leaflet is completed.

In addition, it should be noted that the generation of grammatical text from semantic representation is under the control of "realization grammars" for different languages, which capitalize on the specification of a limited repertoire of semantic constructors to guarantee not only grammatical, but even idiomatic and stylistic correction of generated texts. Both the content grammars and the realization grammars are formal variants of Definite Clause Grammars, an extension of context-free grammars with unification as described in Document Structure and Multilingual Text Authoring by Caroline Brun, Marc Dymetman, and Veronika Lux, in the Proceedings of First International Conference on Natural Language Generation (INLG'2000), Mitzpe Ramon, Israël, June 2000 which is incorporated herein by reference in its entirety.

While the MDA system capitalizes on the specification of a limited repertoire of semantic constructors to guarantee not only grammatical, but even idiomatic and stylistic correction of generated texts, the MDA system does not test a learner's ability to correctly compose texts in a foreign language. However, some of the functionality of the MDA system can be applied to a new document authoring system for creating exercises for foreign language learning. The language learner can learn a new language under the control of a document authoring system in accordance with the invention. The document authoring system is shown by way of a relative pronouns test example in the graphical user interface of FIGS. 4-7. However, various exemplary embodiments include any grammatical, spelling, or composition test.

Figure 4:
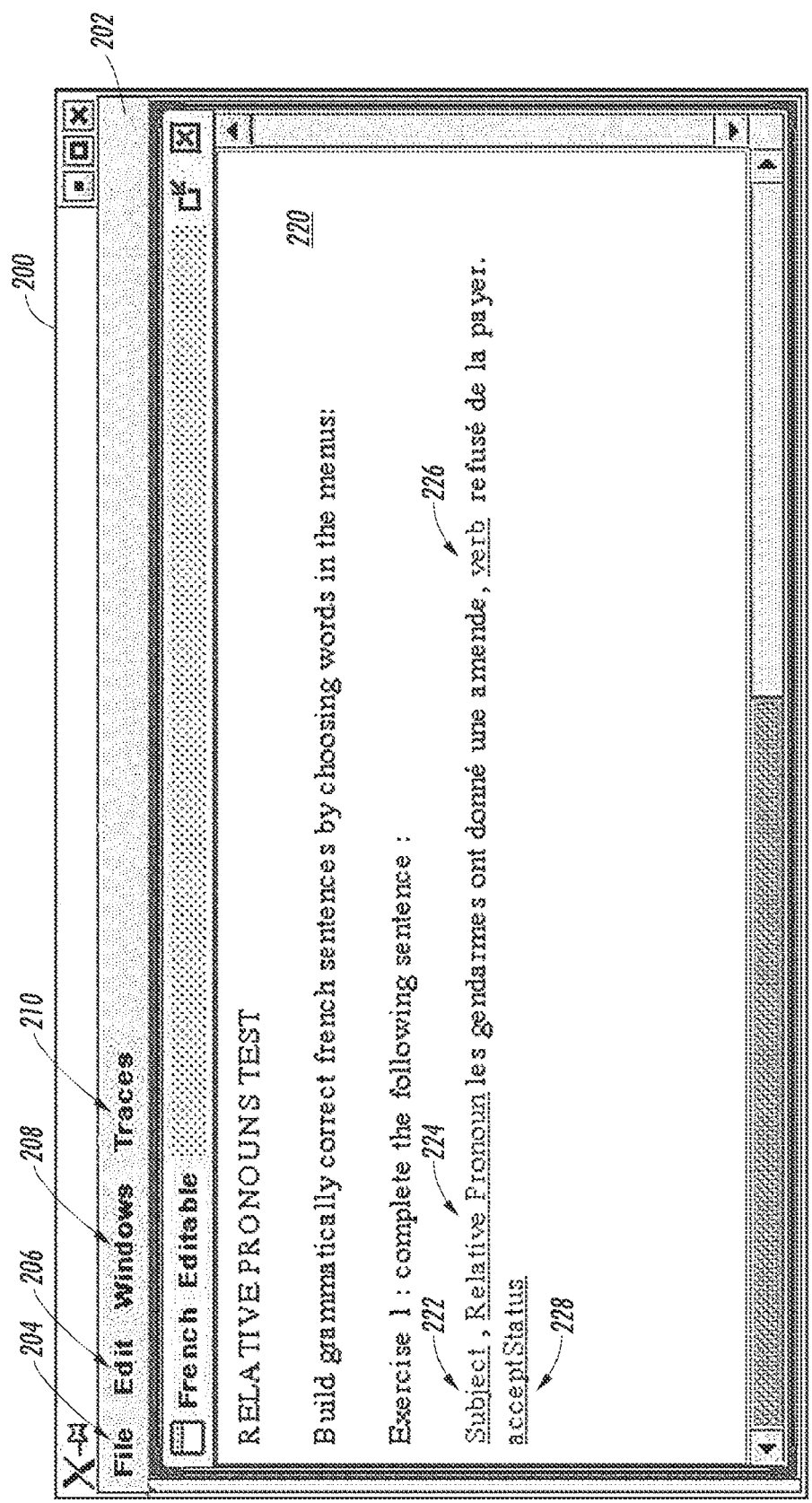
FIGS. 4-7 show a graphical user interface according to an exemplary embodiment of the document authoring systems and methods of this invention.

FIG. 4 shows a graphical user interface 200 to assist an operator or a language learner in learning a new language. The graphical user interface 200 includes a toolbar 202 including menu items file 204, edit 206, windows 208 and traces 210. All of these menu items provide dropdown menus. For example, file 204 provides access to stored documents or creates new documents. Edit 206 permits the user to edit an existing document. Windows 208 allows the user to view one or more documents on the same display screen. Traces 210 allows the user to inspect communication events between the different underlying MDA processes (for debugging purposes).

As discussed above, the system for controlling text authoring and language learning is shown by way of a relative pronouns test example in the graphical user interface of FIGS. 4-7. Any grammatical, semantic, syntactic, contextual, idiomatic, stylistic, and spelling test can be substituted for the relative pronouns test shown in FIGS. 4-7. FIG. 4 shows a plurality of active regions and fixed text. Because the active regions are underlined, the operator or language learner can differentiate the active regions from the fixed regions of text. The active regions shown in window 220 of graphical user interface 200 include subject 222, relative pronoun 224, verb 226 and accept status 228.

Underlining is only one of many different ways to differentiate the active regions from the fixed text. Font type, font size, color, bold/not bold, italics. and upper and lower case characters, underlining, and any combination of the above are only examples. Exactly how each active region is differentiated from the fixed text next is not important.

Figure 5:
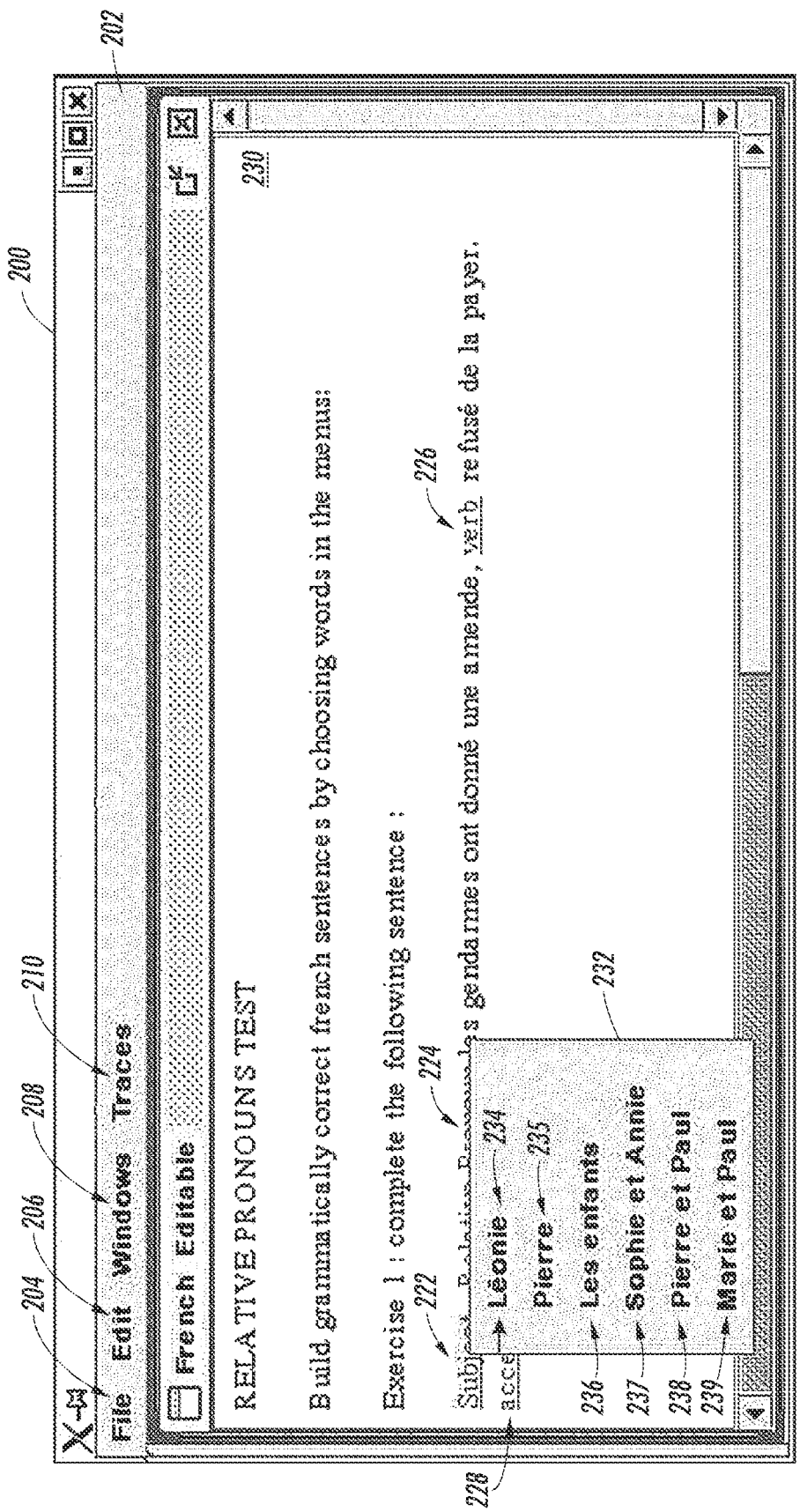

As shown in window 230 of FIG. 5, the active region subject 222 is associated with a dropdown menu 232. An operator or learner can cause the graphical user interface 200 to display dropdown menu 232 associated with subject 222 by moving a cursor onto subject. Alternatively, clicking a mouse, using arrow keys or tabs, hitting a button, hitting an enter or return key on a keyboard, touching a touch screen, speaking a command through a microphone, or the like can all be used by an operator to cause the dropdown menu 232 to be displayed. Preferably, a dropdown menu is associated with each active region. Once the dropdown menu 232 is displayed, the operator or learner can select a subject, such as "Leonie" 234, "Pierre" 235, "Les enfants" 236, "Sophie et Annie" 237, "Pierre et Paul" 238 and "Marie et Paul" 239. If the language learner selects "Leonie" 234, "Leonie" 234 is substituted for subject 222 as shown in window 240 of FIG. 6.

Figure 6:
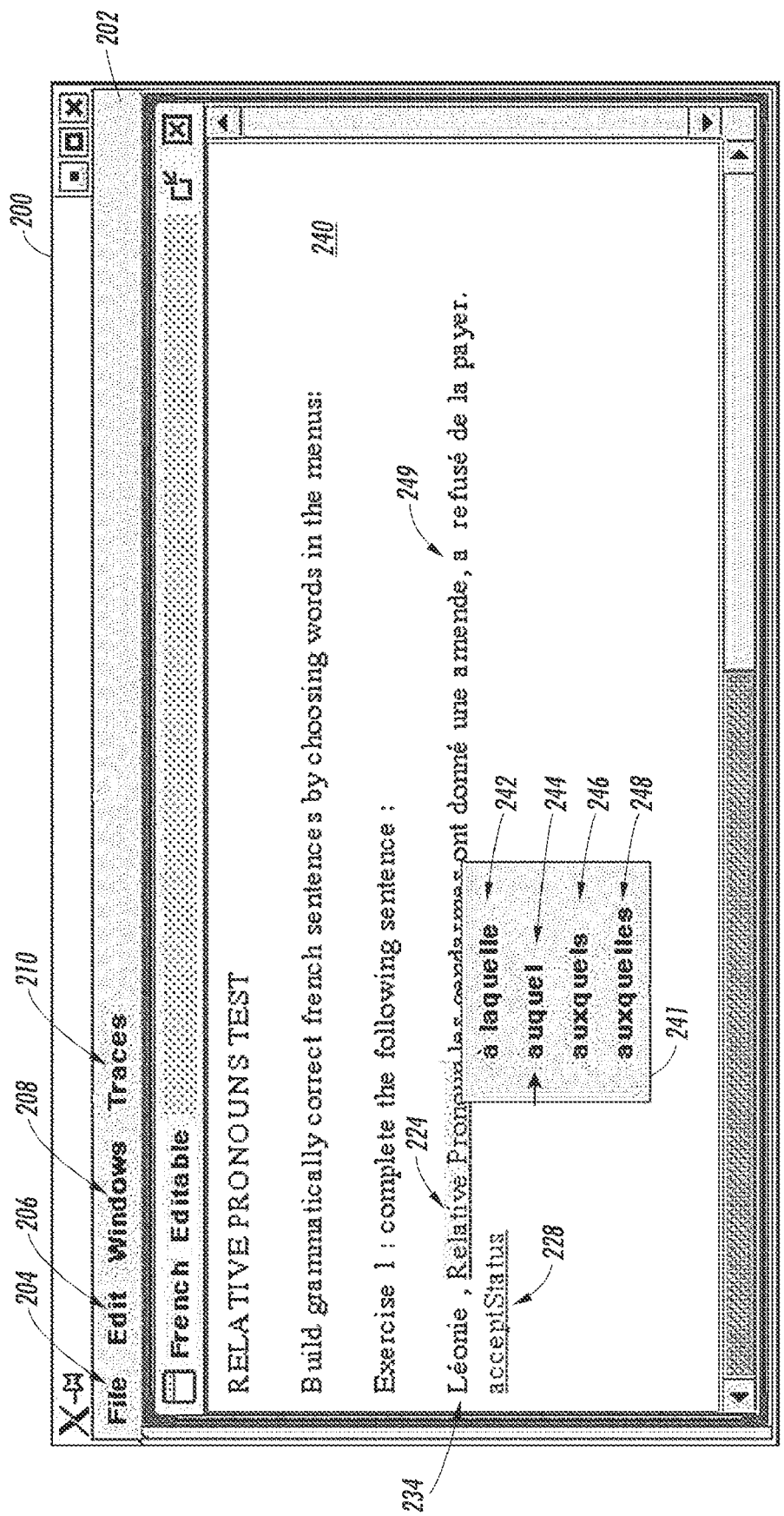

As discussed above, the semantic representations are under the control of a "content grammar" which defines a potentially infinite set of structures built from a limited repertoire of semantic constructors (constants or functions) and respecting certain long-distant semantic coherence conditions. For example, by selecting "Leonie" 234 as shown in FIG. 5, the relative pronoun 224 has a dropdown menu 241 including "a laquelle" 242, "auquel" 244, "auxquels" 246, and "auxquelles" 248 as shown in FIG. 6. If "Sophie et Annie" 236 had been selected instead of "Leonie" in FIG. 6., the dropdown menu 241 of relative pronoun 224 may have been different. In addition, the term "a" 249, which was automatically substituted for verb 226, may have been different as well. In an alternative embodiment, the term "a" 249 may have been selected by the user from an additional dropdown menu of an active region.

Figure 7:
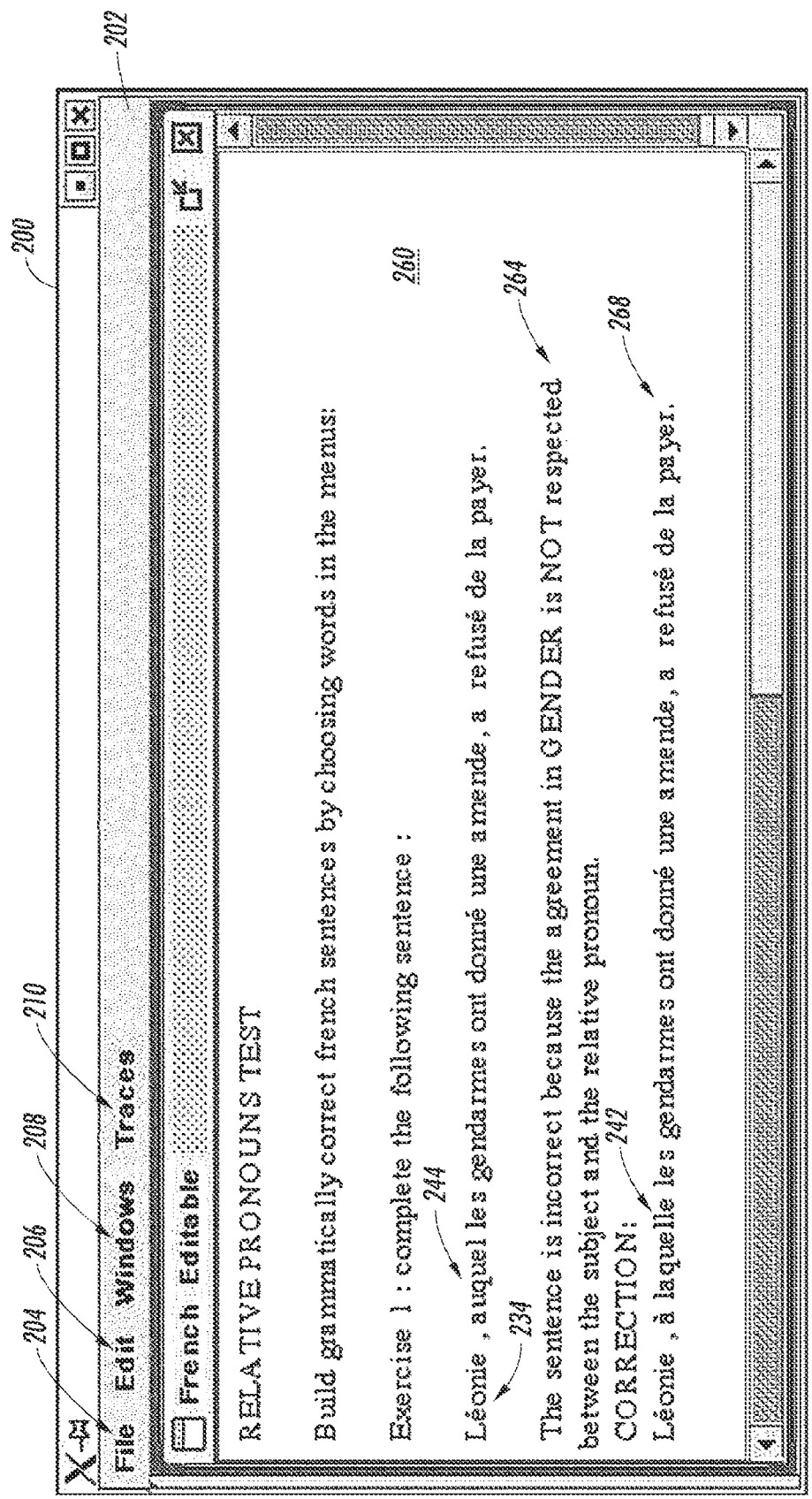

If the learner selects "auquel" 244 in dropdown menu 221 in FIG. 6, the graphical user interface of the language learning system will inform the learner as to whether the learner made a correct selection as shown in window 260 of FIG. 7. In this example, selecting "auquel" 244 was incorrect. Therefore, window 260 of the graphical user interface 200 displays an error message including an explanation 264 as to why the selection of "auquel" 244 was incorrect. Further, window 260 of graphical user interface 200 displays the correct menu choice "a laquelle" 242 and the complete sentence 268 to the language learner or operator, which may also be part of the error message. Alternatively, another output device such as a speaker or printer could have communicated this information to the language learner or operator.

In an exemplary embodiment of the invention, the active region "acceptStatus" 228 can be selected by the language learner or operator. When the active region "acceptStatus" 228 is selected, the learner may ask the system to provide the learner or operator with feedback at the point and time of the selection and to inform the learner or operator of any errors committed by the learner or operator, the types of error, and the error messages.

Figure 8:
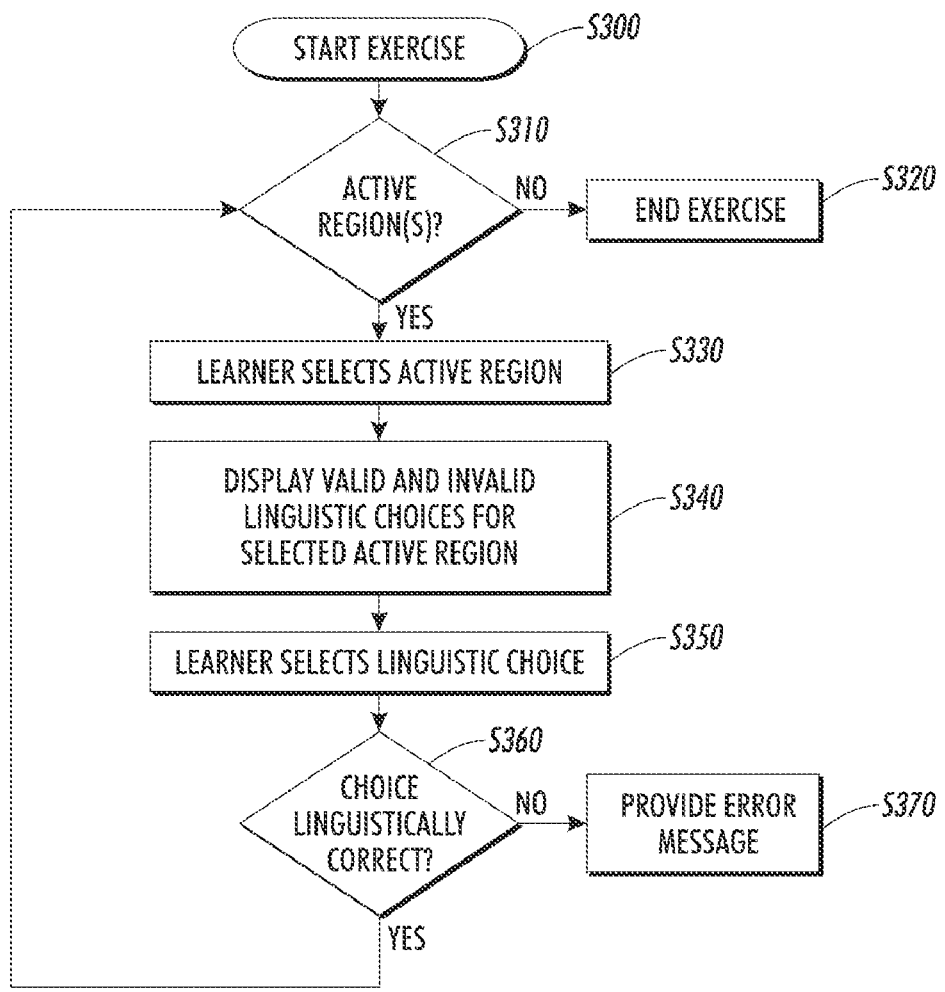
FIG. 8 is a flowchart outlining an exemplary embodiment of a method for controlled text authoring and language learning according to this present invention.

FIG. 8 shows a flowchart of an exemplary embodiment of a method according to this invention. The exemplary embodiment is in the form of an exercise for a language learner. The exercise starts at step S300 and continues to step S370. In step S300, the graphical user interface provides an exercise or test requiring the user to build a grammatically correct French sentence, paragraph, short story, or the like by choosing words listed in a series of menus, such as those shown in FIGS. 4-7. Active regions or slots, which can be selected by a user using a selector such as a computer mouse, are shown in a graphical user interface. Control continues to step S310 where the existence of active regions or slots is checked. If no active regions are shown, then control continues to step S320 where the exercise ends.

If the graphical user interface has active regions, then control jumps to step S330. In step 330, a language learner can select an active region by moving an icon or cursor to the active region or slot for example. If the language learner selects an active region or slot, a drop down menu pertaining to the active region or slot may be displayed in the graphical user interface in step S340. Valid and invalid linguistic choices associated with the active regions or slots are displayed in the drop down menu. Next, in step S350, the language learner can select one of the choices, for example, by moving the icon, cursor, or the like onto the menu choice and by clicking on a computer mouse, hitting an enter key, touching a display screen, or the like.

Next, in step S360, a determination is made as to whether the selected menu choice is linguistically compatible with previous selected menu choices. If the selected menu choice is linguistically compatible, the selected menu choice appears in the graphical user interface. In order for a selected menu choice to be linguistically compatible in this example, it must be at least semantically and syntactically correct. As shown in the exemplary embodiments of FIGS. 5-6, the user or learner selected "Leonie" 234, which is displayed in the graphical user interface. Since "Leonie" 234 is linguistically compatible, "Leonie" 234 is displayed and the document authoring system determines whether other active regions remain. As shown in FIG. 6 the "Relative Pronoun" 224 active slot remain. Therefore, the learner chooses another active region such as "Relative Pronoun" 224 as shown in FIG. 6. A list of valid and invalid linguistic choices associated with the active region are displayed as shown in FIG. 6. These linguistic choices may be based in part upon the selection of "Leonie" 234 as the "Subject" 222. In addition, there may be one or more valid choices and one or more invalid choices. Control then returns to step S310.

If the learner makes an invalid choice, control proceeds to step S370, where an error message is displayed. In the error message, the error may be explained to the learner, for example, as shown in FIG. 7. In addition, the document authoring system may display the correct answer as shown in FIG. 7. Alternatively, the document authoring system may provide the learner with the opportunity to make another choice on the menu. If this choice is linguistically compatible, then the document authoring system returns to step S310. Although FIG. 7 shows an error message display, the document authoring system could also emit sounds though a speaker to provide an explanation as to why the learner's selection is a mistake.

Although the above example of the document authoring system is applied to a sentence, the document authoring system may be applied to a phrase, a sentence, a paragraph, a poem, a sonnet, a song, a story, a lyric, a novel, a composition or any other expression, which provides more complex problems requiring more difficult linguistic choices as in the example of the well known fable by La Fontaine below.

| | |
|---|---|
| La cigale et la fourmi | The Grasshopper and the Ant |
| (J. de La Fontaine) | (Translation by Michael Star.) |
| La cigale, ayant chanté | The Grasshopper having sung |
| Tout l'été, | All the summer long, |
| Se trouva fort dépourvue | Found herself lacking food |
| Quand la bise fut venue. | When the North Wind began its song. |
| Pas un seul petit morceau | Not a single little piece |
| De mouche ou de vermisseau | Of fly or grub did she have to eat. |
| Elle alla crier famine | She went complaining of hunger |
| Chez la fourmi sa voisine, | To the Ant's home, her neighbour |
| La priant de lui prêter | Begging there for a loan |
| Quelque grain pour subsister | Of some grain to keep herself alive |
| Jusqu'à la saison nouvelle | Till the next season did arrive |
| <<Je vous paierai, lui dit-elle, | "I shall pay you," she said |
| Avant août, foi d'animal, | "Before next August, on my word as an animal |
| Intérêt et principal.>> | I'll pay both interest and principal." |
| La fourmi n'est pas prêteuse; | The Ant was not so inclined: |
| C'est là son moindre défaut. | This not being one of her faults. |
| <<Que faisiez-vous au temps chaud? | "What did you do all summer? |
| Dit-elle à cette emprunteuse. | Said she to the grasshopper. |
| Nuit et jour à tout venant | "Night and day I sang, |
| Je chantais, ne vous déplaise. | I hope that does not displease you." |

| | |
|---|---|
| Vous chantiez? j'en suis fort aise. | "You sang? I will not look askance. |
| Eh bien: dansez maintenant.>> | But now my neighbour it's time to dance." |

The fable is built according to a certain high-level "semantic-rhetorical" script that can be readily transposed to other situations, and it is the very possibility of applying the script to social situations, which represents its value as a fable. The script here is basically one in which an "imprudent character" lives a "careless life" for some time, is caught in a "problem" he has not "anticipated", asks for help from a "prudent character", who "turns him away". With this script in mind, and keeping the sequential structure parallel to that of the original, one may generalize the fable according to the following schema:

IMPRUDENT-CHARACTERS CAREFREE-ACTIVITY
    CAREFREE-DURATION
    PROBLEM-APPEARS
    AT-CAREFREE-ENDTIME
    NOT-A-BIT-OF
    DESIRABLE-RESOURCE
    PROBLEM-IS-PRESENTED
    TO-PRUDENT-CHARACTERS
    REQUEST-FROM-PRUDENT-CHARACTERS
    REQUEST-OBJECT REQUEST-JUSTIFICATION
    . . . .

According to that schema, it is possible to produce many variants of the fable. For example:

| | |
|---|---|
| Les poivrots et la barmaid | The boozers and the bartender |
| Un poivrot et sa clocharde, ayant picolé | A drunkard and his tramp girl, having boozed |
| Toute la journée | All day long, |
| Se trouvèrent fort démunis | Found themselves quite distressed |
| Quand le crépuscule fut venu | When dusk time came |
| Pas un verre de pinard | Not a glass of wine |
| Pour se rincer le gosier | To wet their whistle |
| Ils allèrent crier leur soif | They went crying thirst |
| Chez une barmaid de leur quartier | To a barmaid of their district |
| En la priant de leur faire credit | Begging her for a credit |
| De quelques euros bien clinquants | Of a few flashy euros |
| Jusqu'à la prochaine année | Till the year to come |
| <<Nous te rembourserons, lui dirent-ils | "We will repay you," they said |
| Avant ton redressement d'impôt, | "Before your next tax adjustment, |
| Foi de pochards, | Our boozer's word for it, |
| Intérêt et principal.>> | Interest and principal." |
| La tenancière n'est pas prêteuse; | The bartender does not lend much |
| C'est là son moindre défaut. | That is one of her minor faults. |
| <<Que faisiez-vous donc aujourd'hui? | "So what were you doing today? |
| Dit-elle à ces emprunteurs | She said to these borrowers. |
| <<Dès l'aurore, | "Since dawn, |
| Nous cuvions, ne te déplaise | We were sleeping it off, all due respect to you." |
| Vous cuviez? j'en suis fort aise. | "You were sleeping it off? Very pleased to hear it |
| Eh bien: désintoxiquez-vous maintenant.>> | Well then: get yourself detoxified now." |

The document authoring systems and methods of this invention may be applied to the fable to challenge the learner, as shown below. The < > terms are active regions or slots.
<Imprudent Character>, having <verb>,
<carefree duration>,
found <imprudent character pronoun> <problem>.
When <care free end time>,
<no desirable resource>.
<Imprudent character pronoun> went <present problem> to <prudent character>
begging <prudent character pronoun> for <request object>.
"<Imprudent character pronoun> <future payment offer>,
   "<imprudent character pronoun>
"<Future payment offer end time>, <imprudent character pronoun> word for <pronoun>,
interest and principal."
The <prudent character> <verb> <adverb>.
This is one of <prudent character pronoun> faults.
"What did <imprudent character pronoun> do <care free time>?"
<prudent character pronoun> to the <imprudent character pronoun>.
"<During care free time>, <imprudent character pronoun> <verb> <object>.
"<Imprudent character pronoun> <verb> <object>
<End phrase>

At the start of the advanced exercise in the exemplary embodiment, the graphical user interface may provide an advanced relative pronoun test requiring the user to build a grammatically correct French paragraph or short story by choosing words listed in a series of menus. The above example shows some active slots such as "Imprudent Character," "Relative Pronoun," and "verb," which can be selected by a user using a selector such as a computer mouse. If no active slots are shown, then this portion of the exercise ends. However, if the graphical user interface has active slots, then the learner can select an active slot by moving an icon or cursor to the active slot for example. The selection of an active slot causes a drop down menu pertaining to the active slot to be displayed in the graphical user interface. Valid and invalid linguistic choices associated with the active slot are displayed in the drop down menu. The user or learner can select one of the choices by moving the icon, cursor, etc. onto the menu choice and by clicking on a computer mouse, hitting an enter key, touching a display screen, etc.

The document authoring system determines whether the selected menu choice is linguistically compatible with previous selected menu choices. If the selected menu choice is linguistically compatible, the selected menu choice appears in the graphical user interface. There may be one or more valid choices and one or more invalid choices. In order for a selected menu choice to be linguistically compatible, it must be at least semantically and syntactically correct. If the learner makes an invalid choice, an error message is displayed. In the error message, the document authoring system explains the error to the learner. In addition, the document authoring system may display the correct answer. Alternatively, the document authoring system may provide the learner with the opportunity to make another choice on the menu. If this choice is linguistically compatible, then the document authoring system continues to the next active region or slot. If the learner makes another incorrect choice, then the document authoring system explains the error to the learner by displaying a message or emitting sounds through a speaker.

Although the first example was a relative pronoun test and the second example was a one paragraph short story, various grammatical, idiomatic and stylistic tests can be provided to a language learner to assist the language learner in providing complete semantically correct sentences, paragraphs, short stories, and free text compositions, as well as other literary works in the second language.

Figure 9:
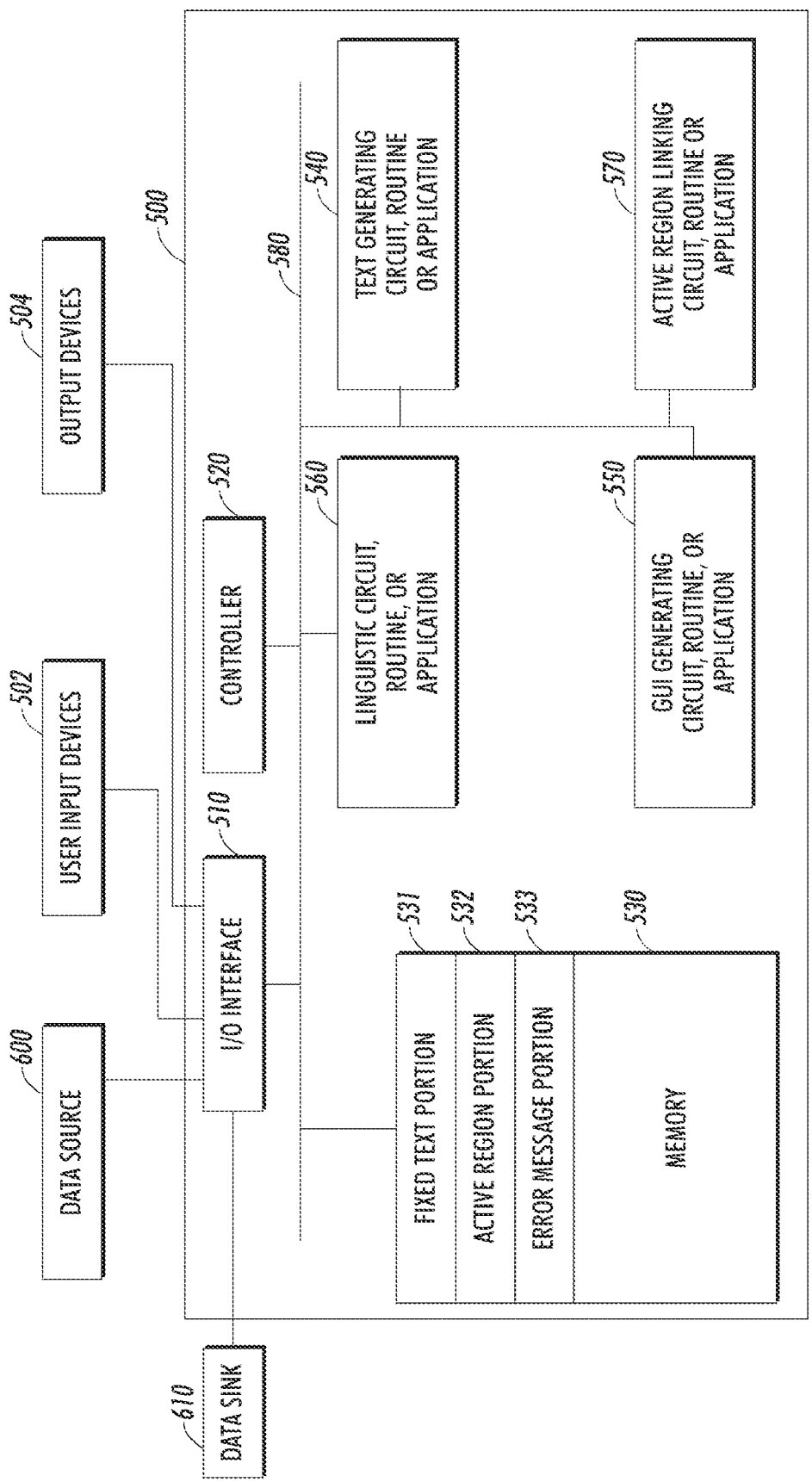
FIG. 9 is a functional block diagram illustrating an exemplary embodiment of a system for controlled text authoring and language learning according to this invention.

FIG. 9 shows one exemplary embodiment of a computing system 500 for controlled text offering and language learning. As shown in FIG. 9, the computing system 500 includes an input/output interface 510, a controller 520, a memory 530, a text generating circuit, routine or application 540, a GUI generating circuit, routine or application 550, a linguistic circuit, routine or application 560, an active region linking circuit, routine or application 570, and communication links 580. The communication links 580 can be a data bus, a public switched telephone network, a local or wide area network, an intranet, the Internet, a wireless transmission channel, any other distributing network, or the like. The memory 530 can be any structural apparatus for temporarily or indefinitely storing data, programs, and the like such as a RAM, a hard drive and disk, a floppy drive and disk, a writeable or re-writeable optical drive and disk, a flash memory, a ROM, a PROM, an EPROM, an EEPROM, an optical ROM disk, a CD-ROM, a DVD-ROM, or the like. The memory 530 includes a fixed text portion 531, an active region portion 532, and an error message portion 533.

A language learner can make selections by way of user input device 502, which communicates with the system 500 via the input/output interface 510. The input device 502 can be any type of device which provides electrical signals to a computer system 500, including, but not limited to, a keyboard, a key, a button, a touch pad, a mouse, a touch screen, and a microphone. The computing system 500 can output signals to output devices 504 such as a display device, printing device, copying device, sound device, image forming device, facsimile device, memory, or the like, which is coupled to I/O interface 510. The computing system 500 can access a data source 600 or send data to a data sink 610 in order to implement the various exemplary embodiments of the systems and methods of the invention. In general, the data sink can be any device that is capable of outputting or storing the processed image data generated according to the systems and methods according to this invention, such as a printing device, copying device, display device, sound device, image forming device, facsimile device, memory, or the like.

As shown in FIG. 9, the systems and methods for controlled text authoring and language learning are, in various exemplary embodiments, implemented on a programmed general purpose computer. However, the various exemplary embodiments of this invention can also be implemented by a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a personal digital assistant (PDA), a PLA, a FPGA, PAL, or the like. In general, any device or machine, capable of implementing the steps in the flowcharts can be used.

In accordance with various exemplary embodiments, once the language learner wishes to start a language learning exercise, the GUI generating circuit, routine, or application 550 is activated or executed by controller 520 to display one or more types of language learning exercises on the output device 504. The language learner can select an exercise using input device 502. After selecting an exercise, the text generating circuit, routine or application 540 provides text having at least one active region. The text can include at least one of a phrase, a sentence, a paragraph, a poem, a sonnet, a song, a story, a lyric, a novel, a composition, an expression, and the like. The text includes fixed text and at least one active region used to test the language learner's grammatical, semantic, syntactic, contextual, idiomatic, stylistic, and spelling knowledge of a language. The fixed text and active regions are may be stored in a fixed text portion 531 and active region portion 532 in memory 530.

Once an active region is selected by a language learner using an input device 502, the active region linking circuit, routine, or application 570 generates at least one linguistically correct choice and at least one linguistically incorrect choice and output device 504 displays a menu of at least one correct linguistic choice and at least one incorrect linguistic choice. The language learner selects one of the linguistic choices in the menu. The linguistic circuit, routine or application 560 determines whether the selected linguistic choice is correct or incorrect. If the language learner selects a correct linguistic choice, the text generating circuit, routine, or application 540 can change the menus of remaining active regions based on the selection of a correct linguistic choice by the language learner.

If the selected linguistic choice is incorrect, the linguistic circuit, routine or application 560 obtains the appropriate error message from the error message portion 533 of memory 530. The error message is displayed by the GUI generating circuit, routine or application 550 on output device 504. The error message may include an explanation as to why the selected linguistic choice is incorrect. The error message may also include the correct linguistic choice with or without an explanation as to why the linguistic choice is correct. Alternatively, the GUI generating circuit, routine or application 550 may not display the correct answer and may display the choices again to permit the language learner to make another selection.

In accordance with various exemplary embodiments of the systems and methods according to this invention, the systems and methods may be applied to e-language exercise tool in an e-language environment as described in U.S. patent application Ser. No. 10/065,443 "System for Learning a Language," which is herein incorporated by reference.

While this invention has been described in conjunction with the exemplary embodiments outlined above, various alternatives, modifications, variations, improvements, and/or substantial equivalents, whether known or that are or may be presently unforeseen, may become apparent upon reviewing the foregoing disclosure. Accordingly, the exemplary embodiments of the invention, as set forth above, are intended to be illustrative, not limiting. Various changes may be made without departing from the spirit and scope of the invention.

What is claimed is:

1. A method for language learning, the method implemented on a computing device, the method comprising:

retrieving text from a memory of the computing device;

replacing each of at least two different portions of the text with a corresponding key word or phrase;

displaying the text having the at least two key words or phrases in a graphical user interface to a learner using the computing device, the text having at least two active regions, each active region corresponding to a respective one of the at least two key words or phrases, wherein the active regions each comprise the respective one of the key words or phrases;

selecting, by the learner from an input of the computing device, a first active region of the active regions by selecting a corresponding first key word or phrase of the key words or phrases;

displaying, on the computing device, a first menu of linguistic choices in response to the selected first key word or phrase, each key word or phrase having an associated menu, each key word or phrase representing a type of answer selection in the associating menu, the linguistic choices for each menu comprising at least two linguistically correct choices and a linguistically incorrect choice;

selecting, by the learner, one of the linguistic choices in the first menu;

providing an error message, to the learner and through the graphical user interface, at the time of selection, when an incorrect linguistic choice is selected, the error message comprising an explanation as to why the selection is incorrect; and when a correct linguistic choice is selected in the step of selecting, by the learner, one of the linguistic choices, the method further comprises:

replacing the first key word or phrase with the selected linguistic choice by the computing device, causing linguistic choices in a second menu associated with another of the active regions in the text to change corresponding to the selected correct choice from the first active region, selecting, by the learner, the another of the active regions and displaying the second menu associated therewith, selecting, by the learner, a linguistic choice in the second menu, determining, by the computing device, whether the linguistic choice selected from the second menu is linguistically compatible with the linguistic choice selected from the first menu of the first active region, and providing another error message when the linguistic choice selected from each of the remaining active regions is incompatible with the linguistic choice selected from the menu of previously selected menu choices, and wherein the active regions correspond to a choice of content of the text that needs to be made by a language learner.

2. The method of claim 1, wherein the text is a single literary unit, and displaying the text in the graphical user interface comprises displaying a plurality of active regions in the text, each active region comprising a different key word or phrase.

3. The method of claim 1, wherein the text is a single literary unit, and the step of displaying the text comprises displaying at least one of a phrase, a sentence, a paragraph, a poem, a sonnet, a song, a story, a lyric, a novel, a composition and an expression.

4. The method of claim 1, wherein the linguistically correct choices are each a choice that is at least one of semantically, grammatically, and syntactically correct.

5. A system for language learning, comprising:

a memory that stores text;

a computing device that retrieves the text from the memory, and replaces each of at least two portions of the text with a corresponding key word or phrase;

a display device that displays the text having the at least two key words or phrases in a graphical user interface to a learner using the computing device, wherein the text includes a plurality of active regions, each active region corresponding to a different one of the at least two key words or phrases, each active region being associated with a corresponding menu of linguistic choices, each key word or phrase representing a type of answer selection in the associating menu, the linguistic choices for each menu comprising at least two correct choices and at least one incorrect choice;

an input device that enables a language learner to select a first active region of the active regions by selecting the corresponding key word or phrase of the first active region;

an output device that displays a first menu of linguistic choices of the menus in response to the selection of the first active region, the first menu corresponding to the first active regions, displays an error message when a linguistically incorrect choice is selected, the error message comprising an explanation as to why the selection is incorrect;

wherein the computing device replaces the key word or phrase associated with the first active region with the selected linguistic choice when a correct linguistic choice is selected;

wherein selection of a linguistically correct choice in the first menu of linguistic choices corresponding to the first active region causes linguistic choices in a second menu of linguistic choices corresponding to another of the active regions to change;

wherein the input device enables a language learner to select a second active region of the active regions by selecting the corresponding key word or phrase of the second active region; wherein the output device displays a second menu of linguistic choices of the menus in response to the selection of the second active region, the second menu corresponding to the second active region;

wherein the computing device determines when a linguistic choice selected from the second menu is linguistically incompatible with the linguistic choice selected from the first menu;

wherein each active region corresponds to a choice of content of the text that needs to be made by the language learner;

wherein the output device displays another error message when the linguistic choice selected from each of the remaining active regions is linguistically incompatible with the linguistic choice selected from the menu of previously selected menu choices.

6. The system of claim 5, wherein each menu has a plurality of linguistically incorrect choices.

7. The system of claim 5, wherein each menu has a plurality of linguistically correct choices and a plurality of linguistically incorrect choices.

8. The system of claim 5, wherein the text is a single literary unit.

9. The system of claim 5, wherein
the text is a single literary unit, and
the text is at least one of a phrase, a sentence, a paragraph, a poem, a sonnet, a song, a story, a lyric, a novel, a composition and an expression.

10. A computer program product comprising a computer readable medium having computer readable instructions embodied therein for causing a computer to provide language learning for a language learner, the instructions comprising:
instructions for causing the computer to retrieve stored text;
instructions for causing the computer to replace each of at least two portions of the text with a corresponding key word or phrase;
instructions for causing the computer to display the text having the at least two key words or phrases with a plurality of active regions, each active region corresponding to a different one of the at least two key words or phrases, each active region being associated with a corresponding menu of linguistic choices, each keyword or phrase representing a type of answer selection in the associated menu, the linguistic choices of each menu comprising at least two correct choices and at least one incorrect choice;
instructions for causing the computer to enable a language learner to select a first active region of the active regions by selecting the corresponding key word or phrase of the first active region;
instructions for causing the computer to display a first menu of linguistic choices corresponding to the key word or phrase of the first active region in response to the language learner selecting the key word or phrase of the first active region;
instructions for causing the computer to enable the language learner to select one of the linguistic choices in the first menu;
instructions for causing the computer to provide an error message when a linguistically incorrect choice is selected, the error message comprising explanation as to why the selection was incorrect;
instructions for causing the computer to replace the key word or phrase of the first active region with the selected linguistic choice when a correct linguistic choice is made;
instructions for causing linguistic choices in a second menu associated with another of the active regions in the text to change corresponding to the selected correct choice from the first active region;
instructions for causing the computer to enable a language learner to select the another of the active regions by selecting the corresponding key word or phrase of the another active region;
instructions for causing the computer to display the second menu of linguistic choices corresponding to the key word or phrase of the another active region in response to the language learner selecting the keyword or phrase of the second active region;
instructions for causing the computer to enable the language learner to select one of the linguistic choice in the second menu; and
instructions for determining when a linguistic choice selected from a second menu is linguistically incompatible with the linguistic choice selected from the first menu,
wherein each active region corresponds to a choice of content of the text that needs to be made by the language learner, and
wherein another error message is provided when the linguistic choice selected from each of the remaining active regions is linguistically incompatible with the linguistic choice selected from the menu of previously selected menu choices.

11. The computer program product of claim 10, wherein each menu has a plurality of linguistically incorrect choices.

12. The computer program product of claim 10, wherein each menu has a plurality of linguistically correct choices and a plurality of linguistically incorrect linguistic choices.

13. The computer program product of claim 10, wherein
the text is a single literary unit, and
the text is one of a phrase, a sentence, a paragraph, a poem, a sonnet, a song, a story, a lyric, a novel, a composition, and an expression.

* * * * *